Jan. 4, 1949.  P. H. JOHNSON ET AL  2,458,078
SELF-PROPELLED TRACK-LAYING VEHICLE
Filed June 14, 1945  4 Sheets-Sheet 1
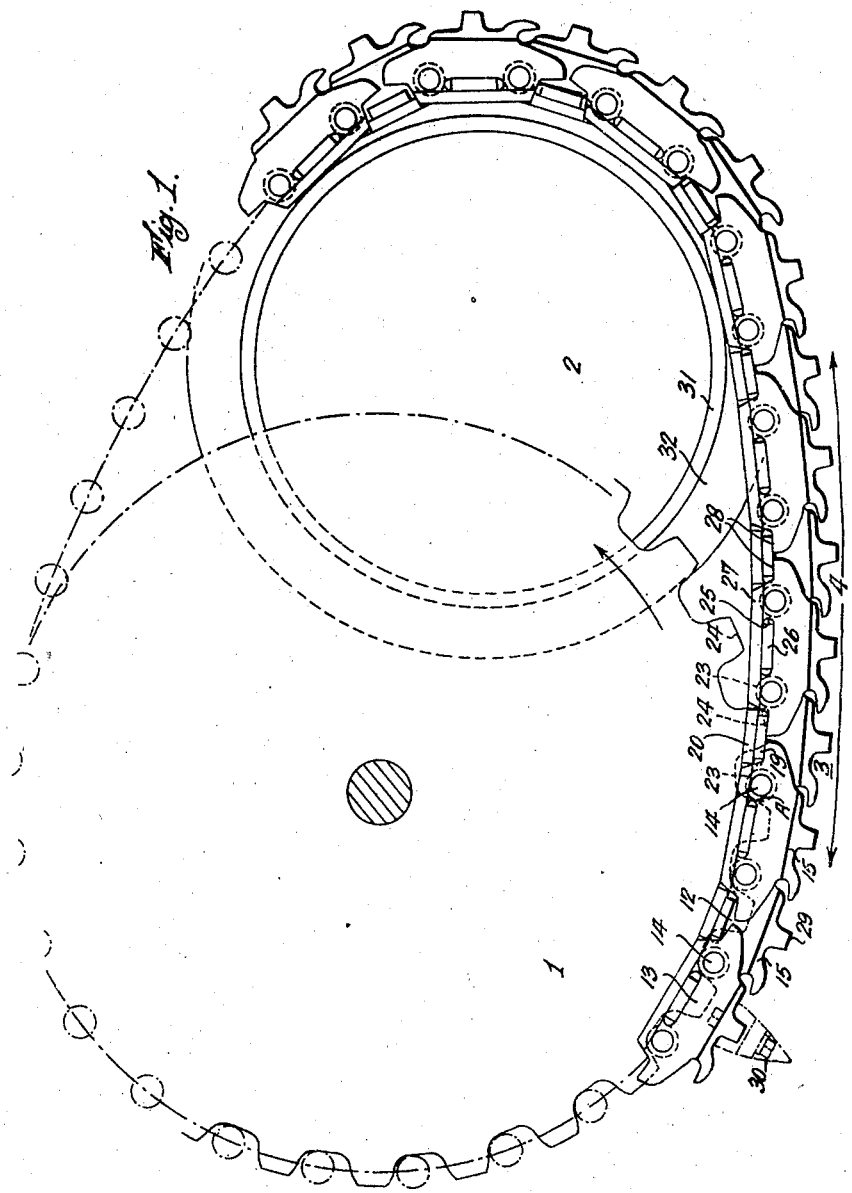
INVENTOR
PHILIP HENRY JOHNSON,
AND LEONARD WILLIAM TRIPP
By his attorneys,
Baldwin & Wight Jan. 4, 1949.  P. H. JOHNSON ET AL  2,458,078
SELF-PROPELLED TRACK-LAYING VEHICLE
Filed June 14, 1945  4 Sheets-Sheet 2
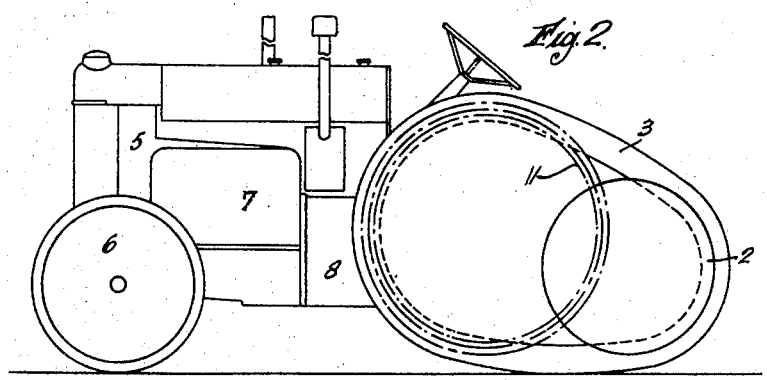
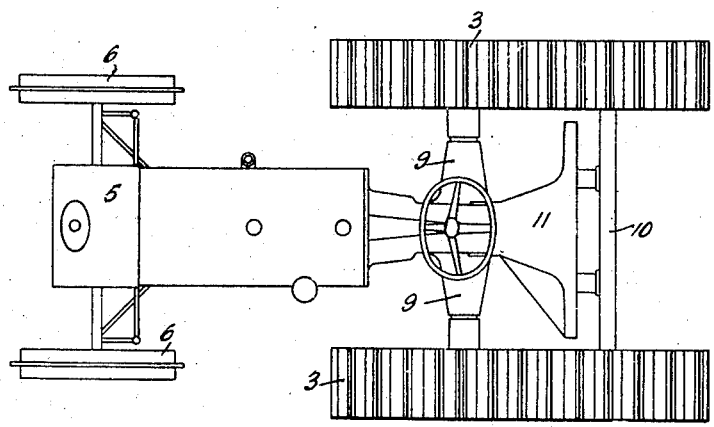
INVENTOR
PHILIP HENRY JOHNSON,
AND LEONARD WILLIAM TRIPP Jan. 4, 1949.   P. H. JOHNSON ET AL   2,458,078
SELF-PROPELLED TRACK-LAYING VEHICLE
Filed June 14, 1945   4 Sheets-Sheet 3
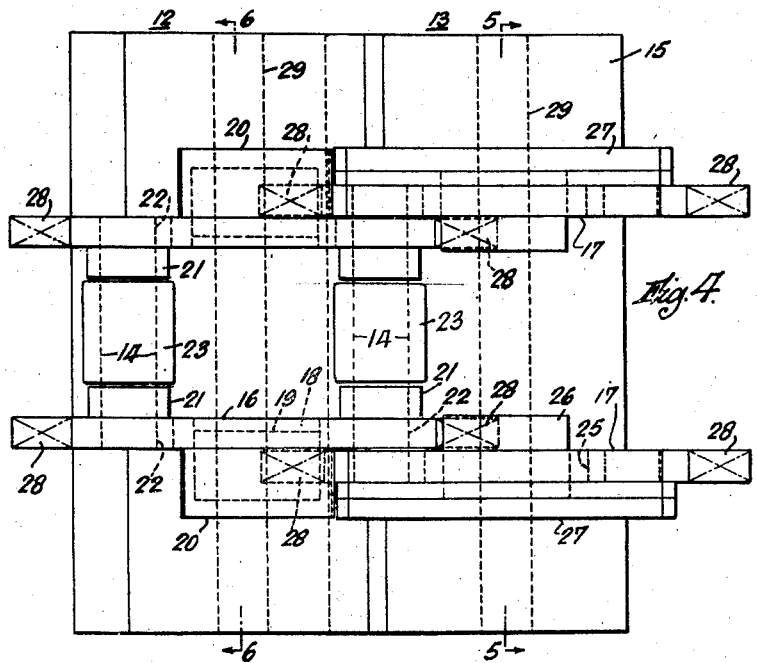
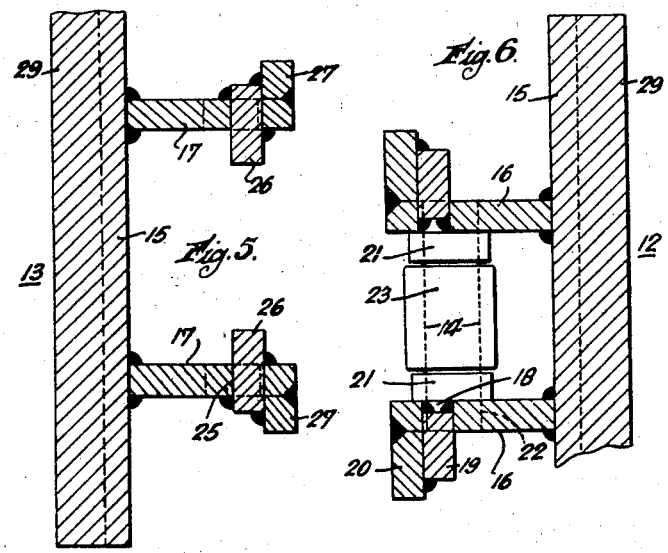
INVENTOR
PHILIP HENRY JOHNSON,
AND LEONARD WILLIAM TRIPP.
By his attorneys
Baldwin & Wight

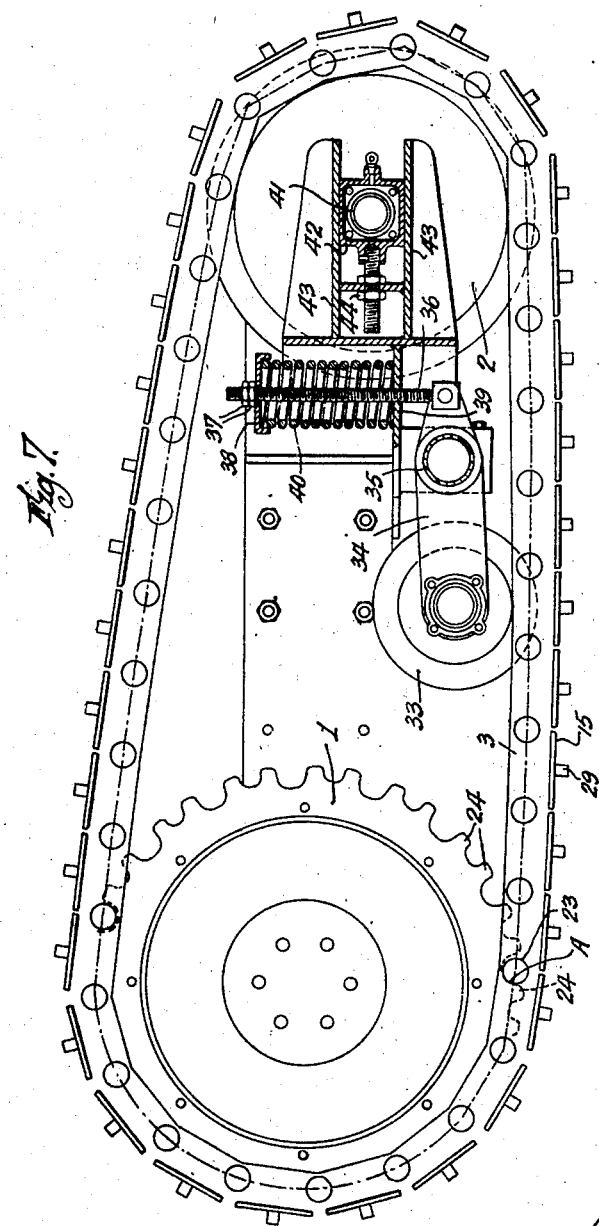

Patented Jan. 4, 1949

2,458,078

UNITED STATES PATENT OFFICE 2,458,078

SELF-PROPELLED TRACK-LAYING VEHICLE

Philip Henry Johnson and Leonard William Tripp, Hounslow, England, assignors to Roadless Traction Limited, Hounslow, England, a company of Great Britain Application June 14, 1945, Serial No. 599,470
In Great Britain December 17, 1943

3 Claims. (Cl. 305—8)

This invention relates to self-propelled tracklaying vehicles.

The object of the invention is to increase the efficiency of such vehicles and to minimize wear and tear in the track joints.

A tracklaying vehicle according to the invention comprises an endless track of the locked girder type and a driving wheel which engages the laid portion of the track at the front (relative to the normal direction of travel of the vehicle) so that the laid portion of the track takes the driving force in compression, the laid portion of the track being loaded so as to be securely locked, and the track-engaging means on the driving wheel being kept out of driving engagement with the wheel-engaging means on the unlaid portion of the track whereby it is ensured that under normal circumstances the wheel exerts no pull on the track. It is intended that the expression "an endless track of the locked girder type" is to be understood as meaning a track composed of links having abutments which interengage to limit the extent of articulation in one direction whereby the laid portion of the track cannot assume a reverse curvature.

In the preferred form of the invention the track is entrained around the driving wheel, the pitch of the wheel-engaging means on the track being less than the pitch of the track-engaging means on the wheel. Thus, if the driving wheel is a toothed sprocket, the greater pitch of the sprocket as compared with that of the elements on the track engaged by the sprocket teeth will ensure a "leaving tooth drive" as opposed to an "entering tooth drive."

The loading of the laid portion of the track to ensure that it is securely locked for taking the drive may be effected by causing the driving wheel to support, on the track, part of the weight of the vehicle, and by entraining the track, behind the laid portion, around an idler supporting, on the track, part of the weight of the vehicle.

A weight-carrying wheel or roller may if desired be provided which bears on the laid track at an intermediate point, being yieldingly mounted so as to ensure under normal conditions it will not unduly relieve the loading on the end portions of the laid track.

In order to ensure that the links of the track pass freely from the unlocked to the locked position, and vice versa, the track is entrained with a sufficiency of slack.

Various constructions of locked girder track may be employed.

It will be understood that single, double or multiple interlock between links may be used. For many purposes it is satisfactory to provide only a single interlock between adjacent links so that the stress is taken partly on the locking faces and partly on the hinge pins.

Various means may be provided on the links for taking the drive from a driving sprocket. The preferred means are rollers mounted on the hinge pins of the links.

The curvature of the track, as determined by the arrangement of interlocking abutments, is preferably such that the interlocking of the links takes places at a point where the track is not in contact with the ground, thus avoiding the scrubbing effect which would otherwise be involved if these links were called upon to assume the locked position when under load and with the spuds in contact with the ground. The curvature is also desirable in order that the penetration of the spuds into the ground to obtain grip is ensured by the intensity of pressure due to the weight of the machine on a small number of them. In certain constructions, however, it may be desirable, in order to provide for the fore and aft stability of the vehicle, that the track shall be so locked as to be flat or substantially flat in contact with the ground.

It will be appreciated that although the laid portion of the track is loaded, so that under normal circumstances it is securely locked so as to provide a rigid rail or rack withstanding without flexing the compressive driving force, conditions may arise in operation when the vehicle may travel over such exceptionally irregular ground surfaces that the interlocking of the track links may momentarily be affected and the drive by compression converted to tension drive. Such conditions are, however, exceptional and the occasional momentary loss of the advantages of compression drive is of relatively slight importance.

Moreover, when the vehicle is driven in reverse the track would be called upon to take the drive under tension, but as no vehicle is likely to be driven in reverse for long distances or at frequent intervals, the loss of the advantages of the compression drive during reverse travel is relatively unimportant.

In order to prevent the teeth or driven elements of the track from riding on the teeth or driving elements of the driving wheel or sprocket, a clearance or gap between the teeth or driving elements of the driving wheel or sprocket is provided so that the teeth or driven elements on the track are able freely to enter on to the driving wheel or sprocket.

It has already been mentioned that the track should be entrained with a sufficiency of slack to ensure that the links of the track pass freely from the unlocked to the locked position and vice versa. If the track were tightly entrained or if any automatically operating track-tensioning device were employed, the locked girder track would operate with considerable friction and inefficiency. This is due to the fact that when the links of the locked girder track pass from the curvature they assume when passing round the driving or idler wheels to the much smaller curvature of their locked position, a momentary demand is made for track slack to accommodate this movement. If this small but important track slack is not available, or its instantaneous availability is resisted by track tension, excessive frictional resistance will be set up, unnecessary wear and tear will be developed and the overall efficiency of the vehicle will be reduced. The actual amount of track slack necessitated by these considerations is governed by the pitch of the track and the diameter of the wheels round which it is entrained. It can therefore only be defined in relationship to a specific vehicle but the slack provided should not appreciably exceed that required to ensure that the links of the track pass freely from the unlocked to the locked position and vice versa.

The construction according to the invention ensures that the joints of the track links are not subjected to movement whilst under any loading arising either from the drive or from the weight of the vehicle. Accordingly they will have a long life. Further, the sprocket teeth or other driving means are not called upon to scrub into or out of engagement with the track, again making for efficiency and durability. Furthermore, the track being driven in compression, such track joint wear as may take place results in the operative track pitch being gradually shortened instead of being lengthened as in the case of tracks driven in tension. Any diametric wear of the sprocket or driving wheel reduces its pitch and therefore sprocket wear operates in harmony with track joint wear and the necessary pitch relationship between the two is substantially preserved.

It will be understood that the invention is applicable to any tracklaying vehicle whether mounted on one or more tracks or pairs of tracks and whether the weight of the vehicle is supported entirely on a track or tracks or partly on a track or tracks and partly on wheels.

The invention is illustrated by way of example in the accompanying drawings in which:

Figure 1 is a side elevation of driving sprocket, endless track and idler;

Figure 2 is a diagrammatic side elevation of a tractor showing, on a smaller scale, the incorporation of the arrangement shown in Figure 1;

Figure 3 is a plan of Figure 2;

Figure 4 is a plan showing, on a larger scale, the detail of the track links;

Figure 5 is a section on the line 5—5 of Figure 4;

Figure 6 is a section on the line 6—6 of Figure 4; and

Figure 7 is a sectional side elevation of a modification.

Referring to the drawings, 1 is a driving sprocket, 2 an idler, and 3 an endless track of the locked girder type entrained around the driving sprocket and idler. The reference numeral 4 indicates the portion of the track laid on the ground.

Referring to Figures 2 and 3, it will be seen that the tractor 5 has ordinary wheels 6 at the front and a pair of endless tracks 3 at the rear. The driving sprockets 1 are driven, in the usual manner, from the motor 7 through gearing in the gearbox 8 and shafting in the axle casing 9. The idlers 2 are rotatably mounted on the fixed shaft 10 attached to the tail member 11. It will be appreciated that the driving sprockets, idlers and endless tracks may be removed and replaced by ordinary wheels mounted on the driving shafting, if and when it is desired to convert the tractor into a 4-wheeled vehicle, and vice-versa.

The links of the track are alternately internal links 12 and external links 13 hinged together by hinge-pins 14 (see Figure 1). Each link (see more particularly Figures 4, 5 and 6) comprises a ground plate 15. The internal links have side plates 16 welded to the ground plate and the external links have side plates 17 welded to the ground plate. The links 13 are termed "external links" because their side plates 17 are outside of or external with respect to the side plates 16 of the internal links 12. Conversely, the links 12 are termed "internal links" because their side plates 16 are inside of or internal with respect to the side plates 17 of the links 13. The side plates 16 are slotted at 18 to receive abutment plates 19 welded in position. Roller-path plates 20 are welded flush with the tops of the side plates 16. Hollow bosses 21 are welded to the side plates around the hinge-pin holes 22. Between these bosses are mounted, on the hinge pins, rollers 23 for engagement with the track-engaging teeth 24 of the driving sprocket 1.

The side plates 17 of the external links 13 are slotted at 25 to receive abutment plates 26 welded in position. Roller-path plates 27 are welded flush with the tops of the side plates 17.

The ends of the side plates 16 and 17 are formed with abutment faces 28 which are adapted to engage the undersides of the abutment plates 19 and 26 respectively whereby the portion of the endless track laid on the ground is locked against opening out flat or into reverse curvature. As will be seen from Figure 1, the laid portion of the track is held to a small convex curvature bearing on the ground. The ground plates 15 are formed with spades 29 to engage the ground. To every second or third of these spades there may may be bolted spade lugs 30 to meet severe working conditions.

The teeth 24 of the driving sprocket 1 are spaced apart with a pitch slightly greater than the pitch of the spacing of the rollers 23. For instance, if the pitch of the rollers is 5 inches the chordal pitch of the sprocket teeth is, say, 5.035 inches.

By reason of this difference of pitch the drive upon the track from the sprocket will be a "leaving tooth drive." That is to say, the drive is substantially entirely at the point indicated by the arrow A in Figure 1. This drive, which is wholly compressive, is concentrated upon the laid portion 4 of the track which is securely locked like a rigid girder due to the engaging of the link abutments and to the heavy loading at the ends of the laid portion of the track by the driving sprocket 1 and idler 2 both of which, as will be seen from Figures 2 and 3, support part of the weight of the tractor 5.

The idler 2 is formed with a smooth rim 31, intermediate side flanges 32 (Figure 1), rolling on the roller path plates 20 and 27 of the links.

In the modification shown in Figure 7, in which like parts are indicated by the same reference numerals as in the other figures, and in which the endless track is shown more diagrammatically, there is provided a weight-carrying wheel or roller 33 which bears on the laid track at a point between the driving sprocket 1 and idler 2. This intermediate wheel is mounted on the end of a lever arm 34, pivoted at 35 to the chassis of the vehicle. The other end of the lever arm is linked to a rod 36 on which are threaded nuts 37 engaging a cap 38, between which and the chassis member 39, is compressed a spring 40. By this means, the intermediate wheel 33 is resiliently mounted and this ensures that under normal conditions it will not unduly relieve the loading on the end portions of the laid track by the sprocket and idler, more particularly the former. Hence the rigidity of the laid portion of the track taking the compressive drive from the leaving sprocket tooth at the point A will be assured under normal conditions.

In order to adjust the track to the correct degree of slackness to ensure that the links of the track pass freely from the unlocked to the locked position, the axle 41 of the idler 2 is carried in a mounting 42 slidable in guides 43 and adapted to be locked in the required position of adjustment by the nuts 44.

What we claim is:

1. A tracklaying vehicle comprising an endless track of the locked girder type composed of links having abutments which inter-engage to limit the extent of articulation in one direction whereby the laid portion of the track cannot assume a reverse curvature, a driving wheel around which the track in front, relative to the normal direction of travel of the vehicle, of the laid portion is entrained, and an idler around which the track in rear of the laid portion is entrained, the driving wheel and idler each transmitting a part of the weight of the vehicle upon the track so as to load the laid portion of the track at its ends and thus ensure that it is securely locked, track-engaging means on the driving wheel, and wheel-engaging means on the track so that the laid portion of the track takes the driving force in compression, the pitch of the track-engaging means being greater than the pitch of the wheel-engaging means, whereby it is ensured that under normal circumstances the wheel exerts no pull on the track.

2. A tracklaying vehicle as claimed in claim 1 in which the track is entrained with a sufficiency of slack to ensure that the links of the track pass freely from the unlocked to the locked position.

3. A tracklaying vehicle as claimed in claim 1 in which a weight-carrying wheel bears on the laid track at a point intermediate between the driving wheel and idler and is yieldingly mounted so as to ensure that under normal conditions it will not unduly relieve the loading on the end portions of the laid track.

PHILIP HENRY JOHNSON.
LEONARD WILLIAM TRIPP.

No references cited.